US012578283B2

(12) United States Patent

Kappa Venkata et al.

(10) Patent No.: US 12,578,283 B2

(45) Date of Patent: Mar. 17, 2026

(54) AIRCRAFT FUEL SYSTEM CONTAMINATION DETECTOR

(71) Applicant: Hamilton Sundstrand Corporation, Charlotte, NC (US)

(72) Inventors: Suresh Babu Kappa Venkata, Karnataka (IN); Srikanth Annumandla, Telangana (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 136 days.

(21) Appl. No.: 18/521,776

(22) Filed: Nov. 28, 2023

(65) Prior Publication Data

US 2025/0110060 A1     Apr. 3, 2025

(30) Foreign Application Priority Data

Sep. 29, 2023    (IN) .............................. 202311065718

(51) Int. Cl.
G01N 21/94          (2006.01)
B60K 15/03          (2006.01)
              (Continued)

(52) U.S. Cl.
CPC ........... G01N 21/94 (2013.01); B64D 37/005 (2013.01); G01N 21/9072 (2013.01); B60K 2015/0321 (2013.01)

(58) Field of Classification Search
CPC .. G01N 21/94; G01N 21/9072; B64D 37/005; B60K 2015/0321
See application file for complete search history.

(56) References Cited

U.S. PATENT DOCUMENTS

| 4,256,403 A | 3/1981 | Powell |
| 7,768,646 B1 | 8/2010 | Mentzer et al. |

(Continued)

FOREIGN PATENT DOCUMENTS

| CN | 104677860 B | 2/2017 |
| DE | 102017205981 A1 | 10/2018 |

(Continued)

OTHER PUBLICATIONS

Search Report issued in European Patent Application No. 24203373. 6; Date of Mailing Feb. 27, 2025 (8 pages).

*Primary Examiner* — Jennifer D Bennett

(74) *Attorney, Agent, or Firm* — CANTOR COLBURN LLP

(57) ABSTRACT

A fuel tank system is disclosed. The fuel tank system includes a fuel tank and a detection system associated with the fuel tank. The detection system includes a source device emitting light into the fuel tank and an analysis device. The analysis device includes a collection device capturing scattered light resulting from the emitted light interacting with fuel in the fuel tank and providing an optical signal corresponding to the captured scattered light. The analysis device includes an optical detection device converting the optical signal to an electronic signal representative of properties of the captured scattered light and a computing device. In one or more embodiments, the computing device generates, based on the electronic signal, data including an indication of: a presence or absence of one or more contaminants in the fuel tank, a type of the one or more contaminants, and location information of the fuel and contaminants.

18 Claims, 5 Drawing Sheets

(51) Int. Cl.
    *B64D 37/00*        (2006.01)
    *G01N 21/90*       (2006.01)

(56)            References Cited

U.S. PATENT DOCUMENTS

| | | | |
|---|---|---|---|
| 8,096,177 | B2 | 1/2012 | Burris |
| 10,527,480 | B2 | 1/2020 | Cipullo et al. |
| 2009/0185188 | A1* | 7/2009 | Verdegan ............. G01N 21/532 |
| | | | 356/337 |
| 2011/0130882 | A1* | 6/2011 | Perez ................. G01N 33/2835 |
| | | | 700/282 |
| 2015/0168368 | A1 | 6/2015 | Hegazi et al. |
| 2016/0231231 | A1 | 8/2016 | Chan |
| 2017/0241905 | A1 | 8/2017 | Reynard |
| 2019/0242814 | A1* | 8/2019 | Bachalo ................. G01N 21/85 |
| 2021/0139040 | A1* | 5/2021 | Ganiger ................. G06N 20/00 |

FOREIGN PATENT DOCUMENTS

| | | | |
|---|---|---|---|
| DE | 102019212305 | A1 | 2/2021 |
| JP | 2014182025 | A | 9/2014 |

* cited by examiner

Emit Light
505

Capture Light
510

Convert Optical Signal
515

Generate Data
520

Determine Presence or Absence of Contaminant(s)
525

Determine Type of Contaminant(s)
530

Display Multidimensional Representation
535

500

AIRCRAFT FUEL SYSTEM CONTAMINATION DETECTOR

CROSS-REFERENCE TO RELATED APPLICATIONS

This application claims the benefit of Indian Application No. 202311065718 filed Sep. 29, 2023, the disclosure of which is incorporated herein by reference in its entirety.

BACKGROUND

The subject matter disclosed herein generally relates to fuel systems, and, more particularly, to fuel tank system contamination detection used in a vehicle.

In some vehicle systems (e.g., aircraft systems), fuel contamination in a fuel tank may lead to fuel starvation. Fuel starvation occurs when the available fuel in the fuel tank is unavailable to reach the engine of a vehicle system. For example, contaminants (e.g., water, debris, microbes (also referred to herein as a microbial organism or a microbial growth)) in the fuel tank(s) of a vehicle may clog fuel supply lines and filters, which may thereby starve the engines of the fuel. Techniques for detecting fuel contamination are desired.

BRIEF DESCRIPTION

A fuel tank system for an aircraft is disclosed. The fuel tank system includes a fuel tank and a contamination detection system associated with the fuel tank. The contamination detection system includes a source device emitting light into the fuel tank. The contamination detection system includes a collection device capturing scattered light resulting from the emitted light interacting with fuel in the fuel tank and providing an optical signal corresponding to the captured scattered light. The contamination detection system includes an optical detection device converting the optical signal to an electronic signal representative of properties of the captured scattered light, where the properties include a wavelength and an intensity value of one or more portions of the captured scattered light. The contamination detection system includes a computing device generating, based on the electronic signal, data including an indication of: a presence or absence of one or more contaminants included in the fuel tank; a type of the one or more contaminants. In one or more embodiments, the indication is of first location information of the fuel with respect to at least one of: a volume of the fuel tank; the one or more contaminants; and one or more components of the fuel tank. In one or more embodiments, the indication is of second location information of the one or more contaminants with respect to at least one of: the volume of the fuel tank; the fuel; and the one or more components of the fuel tank.

In addition to one or more of the features described above, or as an alternative to any of the foregoing embodiments, the captured scattered light includes first light associated with a reflection or a transmission of the emitted light by the fuel, where the first location information of the fuel is determined by the computing device based on a first intensity value associated with the first light. In one or more embodiments, the captured scattered light includes second light associated with a second reflection or a second transmission of the emitted light by the one or more contaminants, where second location information of the one or more contaminants is determined by the computing device based on a second intensity value associated with the second light.

In addition to one or more of the features described above, or as an alternative to any of the foregoing embodiments, the data further includes a second indication of at least one of: a percentage of the fuel with respect to a capacity of the fuel tank; a second percentage of the one or more contaminants with respect to the capacity of the fuel tank; and a ratio associated with the one or more contaminants and the fuel.

In addition to one or more of the features described above, or as an alternative to any of the foregoing embodiments, the data further includes an indication of: a flow parameter of the fuel; and a contaminant associated with the flow parameter.

In addition to one or more of the features described above, or as an alternative to any of the foregoing embodiments, the fuel tank system further includes a user interface, where the contamination detection system displays a multidimensional representation of the fuel tank, the fuel, and the one or more contaminants, via the user interface, based on the data generated by the computing device.

In addition to one or more of the features described above, or as an alternative to any of the foregoing embodiments, the computing device determines the presence or absence of the one or more contaminants based on a comparison of a wavelength of the one or more portions of the captured scattered light to a reference wavelength corresponding to a presence of the fuel. In one or more embodiments, the computing device determines the type of the one or more contaminants based on a comparison of the wavelength of the one or more portions of the captured scattered light to a set of candidate wavelengths corresponding to a set of candidate contaminant types.

In addition to one or more of the features described above, or as an alternative to any of the foregoing embodiments, the captured scattered light includes first light associated with a reflection or a transmission of the emitted light by the fuel, where the first light is of a first wavelength. In one or more embodiments, the captured scattered light includes second light associated with a reflection or a transmission of the emitted light by the one or more contaminants, where second light is of a second wavelength different from the first wavelength. In one or more embodiments, a wavelength of the emitted light is different from the first wavelength and the second wavelength.

In addition to one or more of the features described above, or as an alternative to any of the foregoing embodiments, the one or more contaminants include at least one of: ice; water; one or more microbes; and a second fuel, where the second fuel is of a second fuel type different from a first fuel type of a first fuel included in the fuel tank.

In addition to one or more of the features described above, or as an alternative to any of the foregoing embodiments, the fuel tank system further includes a second contamination detection system including: a second source device emitting second light into the fuel tank; and a second collection device capturing second scattered light resulting from the emitted second light interacting with the fuel and providing a second optical signal corresponding to the captured second scattered light. In one or more embodiments, the source device and the collection device are disposed along a first axis of the fuel tank. In one or more embodiments, the second source device and the second collection device are disposed along a second axis of the fuel tank. In one or more embodiments, the optical detection device converts the second optical signal to a second electronic signal representative of the properties of the captured second scattered light. In one or more embodiments, the computing device generates the data further based on the second electronic signal.

In addition to one or more of the features described above, or as an alternative to any of the foregoing embodiments, the contamination detection system emits the light, captures the scattered light, converts the optical signal to the electronic signal, and generates the data in response to one or more trigger conditions, where the one or more trigger conditions include a user input and a temporal condition.

Also disclosed is a fueled vehicle including the fuel tank system according to any one or combination of the embodiments described herein.

Also disclosed is a computer-implemented method including emitting, by source device in response to a control signal, light into a fuel tank. The computer-implemented method includes capturing scattered light resulting from the emitted light interacting with fuel in the fuel tank and providing an optical signal corresponding to the scattered light. The computer-implemented method includes converting the optical signal to an electronic signal representative of properties of the captured scattered light, where the properties include a wavelength and an intensity value of one or more portions of the captured scattered light. The computer-implemented method includes generating, based on the electronic signal, data including an indication of: a presence or absence of one or more contaminants included in the fuel tank; and a type of the one or more contaminants. In one or more embodiments, the indication is of first location information of the fuel with respect to at least one of: a volume of the fuel tank; the one or more contaminants; and one or more components of the fuel tank. In one or more embodiments, the indication is of second location information of the one or more contaminants with respect to at least one of: the volume of the fuel tank; the fuel; and the one or more components of the fuel tank.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The presence of contaminants in the fuel system of a vehicle can result in fuel starvation at the engine of the vehicle, resulting in power loss. In an aircraft, for example, the presence of water and microbial growth can result in fuel starvation. In some cases (e.g., while an aircraft is in flight, low external temperatures, and the like), the temperature of the fuel in a fuel tank decreases, and as a result, water in the fuel can settle to the bottom of the fuel tank and freeze. The resulting ice crystals can block fuel inlet pipes, leading to fuel starvation. As to microbial growth, any time fuel and water come into contact, certain bacteria and fungi can grow and propagate quickly. Non-limiting examples of problems which can result in a vehicle due to the growth and propagation of microbes include contaminated fuel, additive degradation, structural damage, clogging or plugging of filters plugging, and slime growth.

Some techniques for identifying fuel contamination (e.g., detecting contaminants) in a vehicle include manual procedures and are performed outside of the vehicle. For example, some techniques for detecting the presence of water in the fuel are implemented using a water paste, and some techniques for detecting the presence of microbial organisms are implemented through laboratory tests.

Examples of problems and disadvantages associated with manual and outside verification techniques are described. Usage of a water detecting paste or transporting samples to a laboratory for analysis result in downtime (e.g., loss of use) of the vehicle while the fuel and the fuel tank are subjected for tests. In some cases, when a vehicle is refueled, there is a possibility of contaminants entering the fuel tank.

Further, the amount of time associated with opening and inspecting a fuel tank for problems that can lead to contamination (e.g., preparation for worst case scenarios) may further add to downtime of a vehicle. In some cases, despite approaches in which a fuel tank is checked for problems that could potentially result in contamination, other factors (e.g., water freezing to ice due to temperature conditions) may still result in fuel blockage.

Figure 1A:
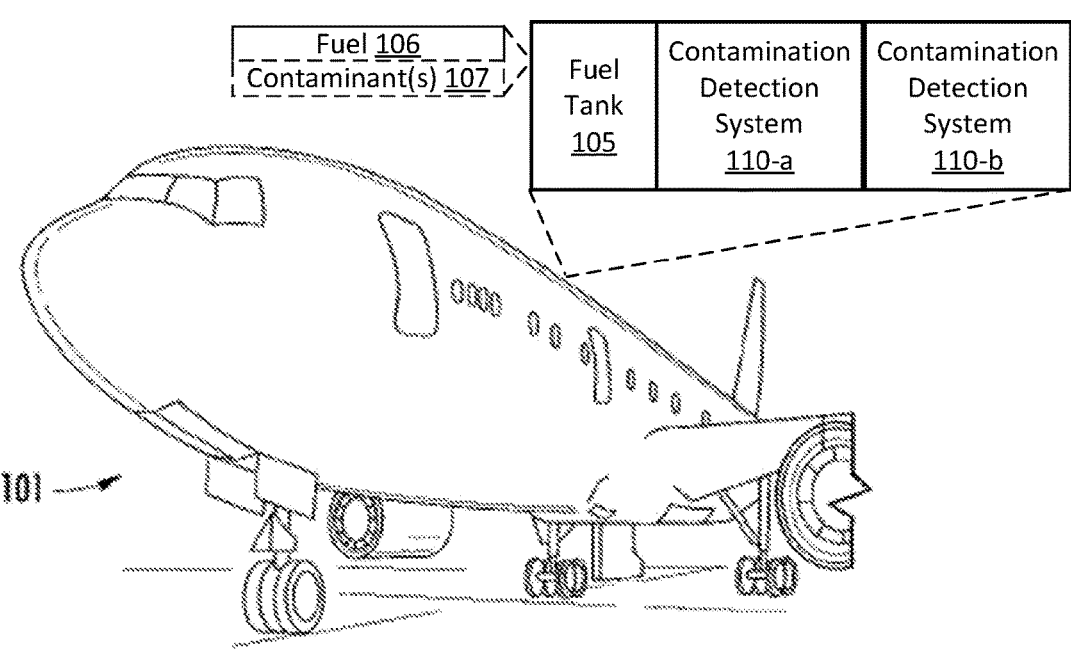
FIGS. 1A and 1B are schematic illustrations of an aircraft that can incorporate various embodiments of the present disclosure.
Figure 1B:
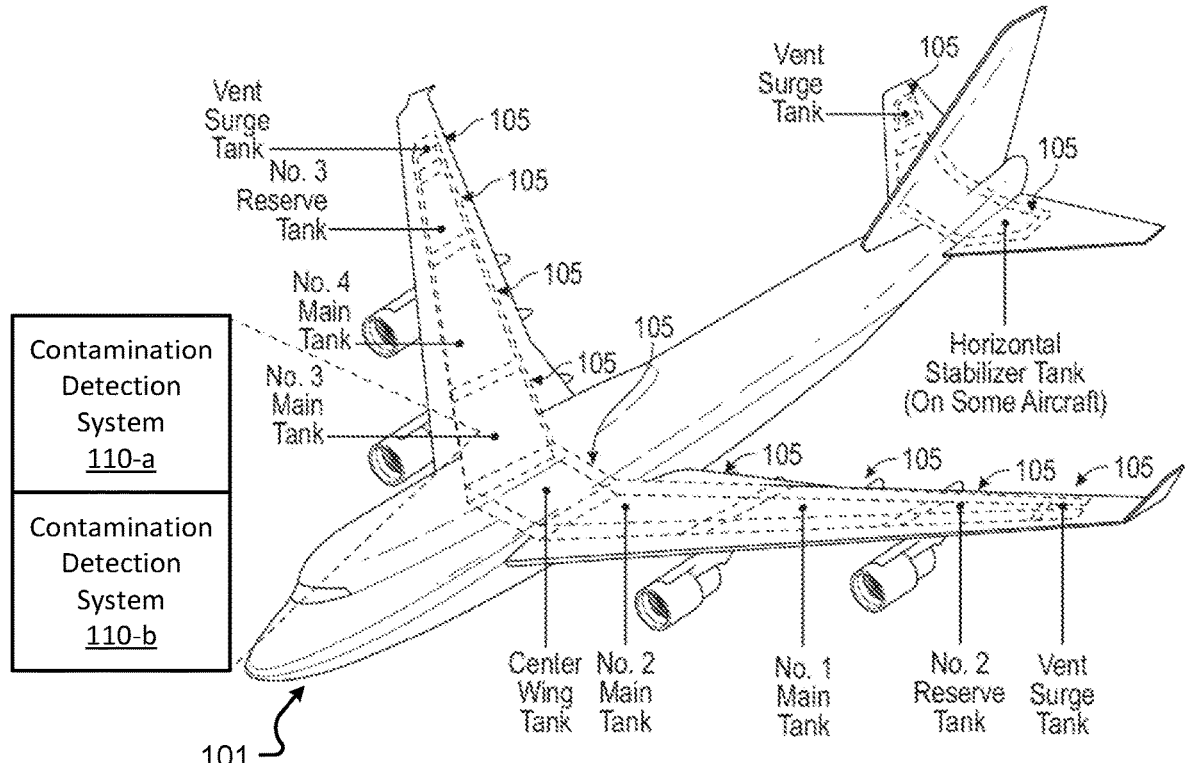

FIGS. 1A and 1B are schematic illustrations of an aircraft 101 that can incorporate various embodiments of the present disclosure. As shown in FIGS. 1A and 1B, an aircraft 101 can include a fuel tank 105 and a contamination detection system 110 (also referred to herein as a fuel system contamination detector (FSCD)). In one or more embodiments, the aircraft 101 may include multiple contamination detection systems 110 (e.g., contamination detection system 110-a and contamination detection system 110-b) associated with the fuel tank 105.

As shown in FIG. 1B, the aircraft 101 can include multiple fuel tanks 105. In one or more embodiments, aspects of the present disclosure support implementations in which the aircraft 101 includes one contamination detection system 110 or multiple contamination detection systems 110 (e.g., contamination detection system 110-a and contamination detection system 110-b) per fuel tank 105.

The systems and techniques described herein support a spectral analysis of a fuel tank 105 for contaminants through spectral analysis using a built-in detector system (e.g., one or more contamination detection systems 110). Example aspects of the contamination detection system 110 and the analysis techniques in accordance with one or more embodiments of the present disclosure are later described with reference to FIGS. 2 and 3.

Figure 2:
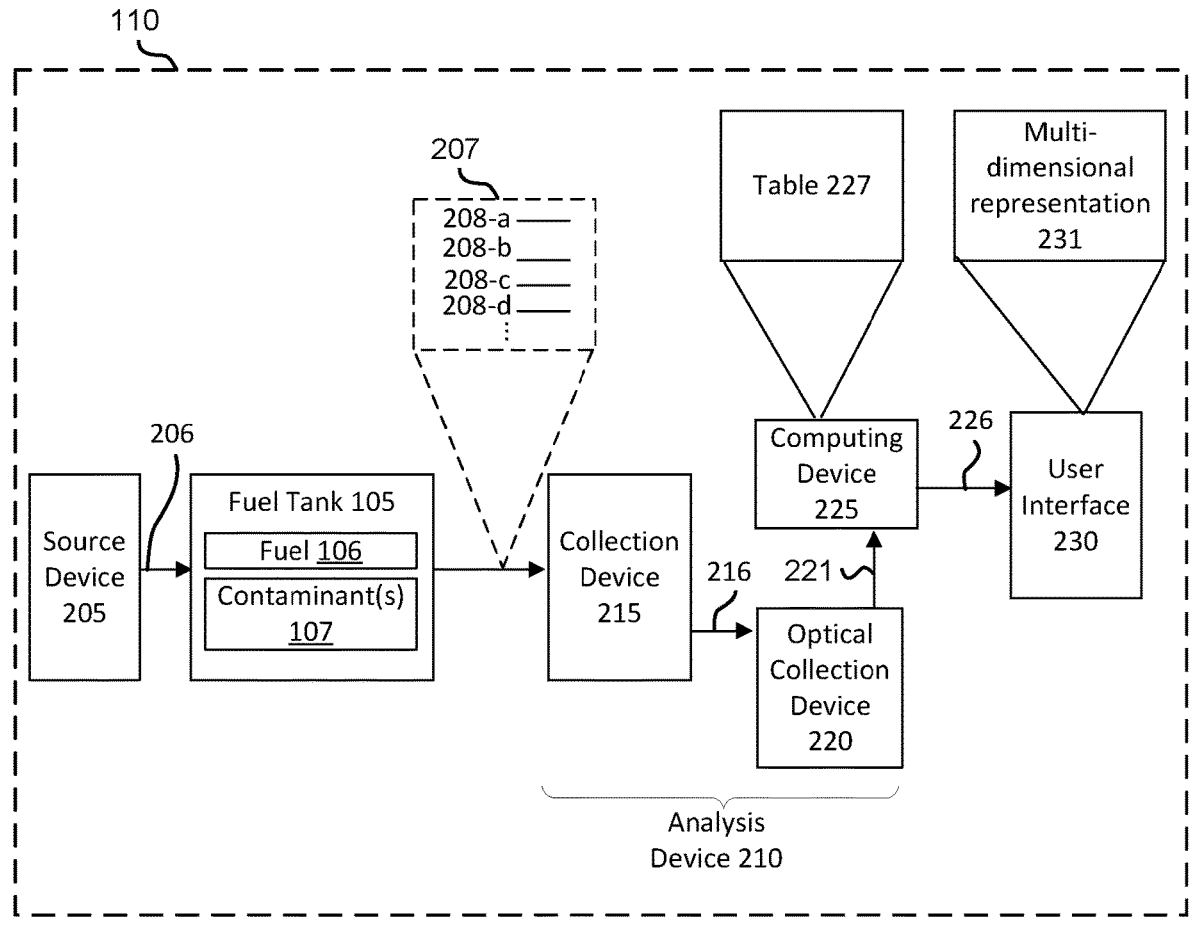
FIG. 2 is a schematic illustration of the contamination detection system in accordance with one or more embodiments of the present disclosure.

FIG. 2 is a schematic illustration 200 of the contamination detection system 110 in accordance with one or more embodiments of the present disclosure. The contamination detection system 110 includes a source device 205 (also referred to herein as a "subjector"), a collection device 215 (also referred to herein as a "collector"), an optical detection device 220, and a computing device 225. In one or more embodiments, the components of the contamination detection system 110 may be implemented as separate components. Additionally, or alternatively, one or more the components may be integrated within a device (e.g., an analysis device 210 described herein). Aspects described herein with reference to the analysis device 210 can be implemented by a suitable component of the contamination detection system 110, and the features are not limited to implementations as a single analysis device 210.

According to one or more embodiments of the present disclosure, the source device 205 is capable of emitting light 206 into the fuel tank 105. In an example, the emitted light 206 is a laser of known wavelength. The analysis device 210 may analyze the fuel 106 by subjecting it to the emitted light 206.

The collection device 215 is capable of capturing light 207 that results from the emitted light 206 interacting with fuel 106 and/or a contaminant(s) 107 in the fuel tank 105. For example, the emitted light 206 can change due to interaction with the fuel 106 and/or the contaminants 107. In an example, the emitted light 206 is scattered by the fuel 106 and the contaminants 107.

The collection device 215 is capable of providing an optical signal 216 corresponding to the captured light 207. In one or more embodiments, the collection device 215 collects all scattered light, filters out light resulting from Rayleigh scattering, and passes the remaining light (e.g., via optical signal 216) to the optical detection device 220.

The optical detection device 220 is capable of converting the optical signal 216 to an electronic signal 221. In an example, the electronic signal 221 may be representative of properties of the captured light 207. Non-limiting examples of the properties represented by the electronic signal 221 include wavelength and intensity value. In one or more embodiments, the contamination detection system 110 may be implemented using suitable signals different from (or in addition to) the optical signal 216 and electronic signal 221 for providing information from the collection device 215 and the computing device 225.

In an example, the captured light 207 may include light 208-*a* resulting due to the effect of the fuel 106 on the emitted light 206 and light 208 (e.g., light 208-*b*, light 208-*c*, light 208-*d*, light 208-*e*, and the like) resulting due to an effect (e.g., transmittance, reflection, refraction, scattering, and the like) on the emitted light 206 by a contaminant 107. For example, light 208-*a* may be a result of scattering of the emitted light 206 by a contaminant 107-*a* (e.g., ice), light 208-*b* may be a result of scattering of the emitted light 206 by a contaminant 107-*b* (e.g., a microbe), and the like. Accordingly, for example, the electronic signal 221 may include data representative of properties of portions of the captured light 207.

According to one or more embodiments of the present disclosure, the computing device 225 is capable of generating, based on the electronic signal 221, data 226. In some aspects, the data 226 includes an indication of a presence or absence of contaminants 107 in the fuel tank 105. For example, the data 226 may include a listing of contaminants 107 present in the fuel tank 105, respective types (e.g., water, ice, microbe, other fuel, and the like), and respective properties (e.g., amount, percentage, shape, location information, and the like).

The contamination detection system 110 is capable of displaying a multidimensional representation 231 of the fuel tank 105 via the user interface 230, based on the data 226 generated by the computing device 225. In some examples, the contamination detection system 110 may display, in the multidimensional representation 231, a graphical representation of the fuel 106, the contaminants 107, and/or other components (e.g., fuel inlet valve, fuel outlet valve, fuel level sensors, fuel boost pump, fuel vent, fuel drain valve anti-slosh baffle) associated with the fuel tank 105. Non-limiting examples of information included in the data 226 and of the multi-dimensional representation 231 are later described with reference to FIG. 4.

In some examples, the user interface 230 may include a display screen, speaker, an audio input device (e.g., microphone), an audio output device (e.g., speakers, headphones), a wearable device (e.g., goggles, a smart watch), a keyboard, a mouse, a printer, a touchpad, a haptic device, and the like. The contamination detection system 110 is capable of providing the data 226 to a user via the user interface 230 according to one or more formats supported by the user interface 230.

The contamination detection system 110 is capable of performing a spectral analysis of the fuel tank 105 and contents (e.g., fuel 106, contaminants 107) of the fuel tank 105. For example, the contamination detection system 110 may be implemented by a spectrometer. The spectrometer is capable of measuring wavelengths of electromagnetic radiation that has interacted with a sample (e.g., emitted light 206 that has interacted with fuel 106 and/or contaminants 107). Incident light can be scattered by, reflected off, absorbed by, or transmitted through a sample. The manner in which the incident light changes during the interaction with the sample is characteristic of the sample. The spectrometer is capable of measuring the change in the incident light over a range of incident wavelengths (or at a target wavelength).

In one or more embodiments, the spectral analysis implemented by the contamination detection system 110 is a Raman spectral analysis, and the source device 205 includes a light source suitable for Raman spectral analysis. For example, the analysis device 210 may support Raman spectroscopy for material analysis of the fuel 106. Raman spectroscopy is non-destructive, can be implemented without sample preparation of the fuel 106, and is capable of providing data 226 which is information rich.

Raman spectroscopy supports chemical and structural identification of materials in the solid, liquid or gas state. Raman spectroscopy supports analytical capabilities, both macro and micro, of a sample without perturbing the sample. Raman spectroscopy supports material investigation in example areas including chemistry, mineralogy, geology, art, archeology, forensic science, material science, and water detection. Utilizing Raman spectroscopy, the systems and techniques described herein are capable of distinguishing contaminants 107 from fuel 106 (e.g., aircraft fuel).

In an example of Raman spectral analysis in accordance with example embodiments of the present disclosure, the contamination detection system 110 uses a laser (e.g., light 206 emitted by source device 205) to illuminate an area (or entire area) of the fuel tank 105. Some of the emitted light 206 may be absorbed by a molecule of interest of a substance (e.g., a molecule of a contaminant 107) and re-emitted at a wavelength different from the wavelength of the laser. The spectrum of the Raman-scattered light is unique to the molecular-bond structure of the substance, constituting a signature based on which the contamination detection system 110 may use for identification of the substance.

In one or more embodiments, a wavelength of the emitted light 206 is a wavelength suitable for the techniques described herein. In an example, the wavelength selection for the fuel analysis is based on factors like the target Raman intensity, spatial resolution, background fluorescence, acquisition time, and the like. Different wavelength regions offer corresponding advantages and disadvantages, and the techniques described herein include selecting the laser based on the contaminants to be detected or studied.

Aspects of the present disclosure may be implemented using other suitable spectral analysis techniques different from (or in addition to) Raman spectral analysis that support the techniques described herein.

According to one or more embodiments of the present disclosure, the source device 205 may be located at one end of the fuel tank 105, and the collection device 215 may be located at an opposite end of the fuel tank 105. In an example, the source device 205 and the collection device 215 may each have a height equal to the height of the fuel tank 105, and the source device 205 and the collection device 215 may be placed lengthwise with respect to the length of the fuel tank 105. Additionally, or alternatively, the source device 205 and the collection device 215 may each have a height equal to the height of the fuel tank 105, and the source device 205 and the collection device 215 may be placed width wise with respect to the width of the fuel tank 105.

In one or more embodiments, if the analysis device 210 identifies from the captured light 207 that a recorded wavelength of at least a portion of the captured light 207 (e.g., a wavelength of light 208-*a*) is other than a reference wavelength (e.g., a wavelength of light resulting from light scattering by the fuel 106), the analysis device 210 may compare the recorded wavelength against candidate wavelengths included in a table 227. The analysis device 210 may identify, from the comparison, a contaminant 107 that is mapped to the recorded wavelength. In an example, each of the candidate wavelengths corresponds to a candidate contaminant type (e.g., ice, water, microbes (microbial growth), other types of fuel, other grades of fuel, sediments, foreign particles, and the like).

Accordingly, for example, the analysis device 210 is capable of determining the presence or absence of a contaminant 107 based on a comparison of a wavelength of light 208 to a reference wavelength corresponding to a presence of the fuel 106. If the analysis device 210 identifies that the wavelength of the light 208 is different from the reference wavelength, the analysis device 210 may conclude that a contaminant 107 is present in the fuel 106. The analysis device 210 is capable of determining the type of the contaminant 107 based on a comparison of the wavelength of the light 208 to candidate wavelengths (corresponding to candidate contaminant types) included in the table 227. In some cases, if the wavelength of the light 208 is different from the reference wavelength but not included among the candidate wavelengths of the table 227, the analysis device 210 may conclude and indicate the light 208 is associated with an unknown foreign medium. In one or more embodiments, the contamination detection system 110 may create an entry in the table 227 that includes an indication of the wavelength and the unknown foreign medium.

In one or more embodiments, the contamination detection system 110 may include the source device 205, the collection device 215, a second source device 205 (not illustrated), and a second collection device 215 (not illustrated). In an example, the source device 205 and the collection device 215 are placed lengthwise with respect to the length of the fuel tank 105, and the second source device 205 and second collection device 215 are placed width wise with respect to the width of the fuel tank 105. Based on light (e.g., emitted light 206) respectively emitted by source device 205 and/or the second source device 205 and light (e.g., captured light 207) respectively collected by collection device 215 and/or the second collection device 215, the analysis device 210 may identify the presence of contaminants 107 in the fuel 106. In one or more embodiments, the analysis device 210 may determine properties (e.g., shapes, location information, percentage amounts, etc.) associated with the fuel 106 and the contaminants 107 as described herein.

In one or more embodiments, the first contamination detection system 110 (e.g., contamination detection system 110-*a*) and the second contamination detection system 110 (e.g., contamination detection system 110-*b*) can both be associated with optical detection device 220 and a computing device 2 based on. For example, the collection device 215 of the first contamination detection system 110 (e.g., contamination detection system 110-*a*) may provide a respective optical signal 216 to the optical detection device 220, the second collection device 215 (not illustrated) of the second contamination detection system 110 (e.g., contamination detection system 110-*a*) may provide a respective optical signal 216 to the optical detection device 220

Additionally, or alternatively, the source device 205 and the collection device 215 may be implemented in a first contamination detection system 110 (e.g., contamination detection system 110-*a*), and the second source device 205 (not illustrated) and the second collection device 215 (not illustrated) may be implemented in a second contamination detection system 110 (e.g., contamination detection system 110-*b*). For example, the contamination detection systems 110 may each include a respective optical detection device 220 and a respective computing device 225.

Figure 3:
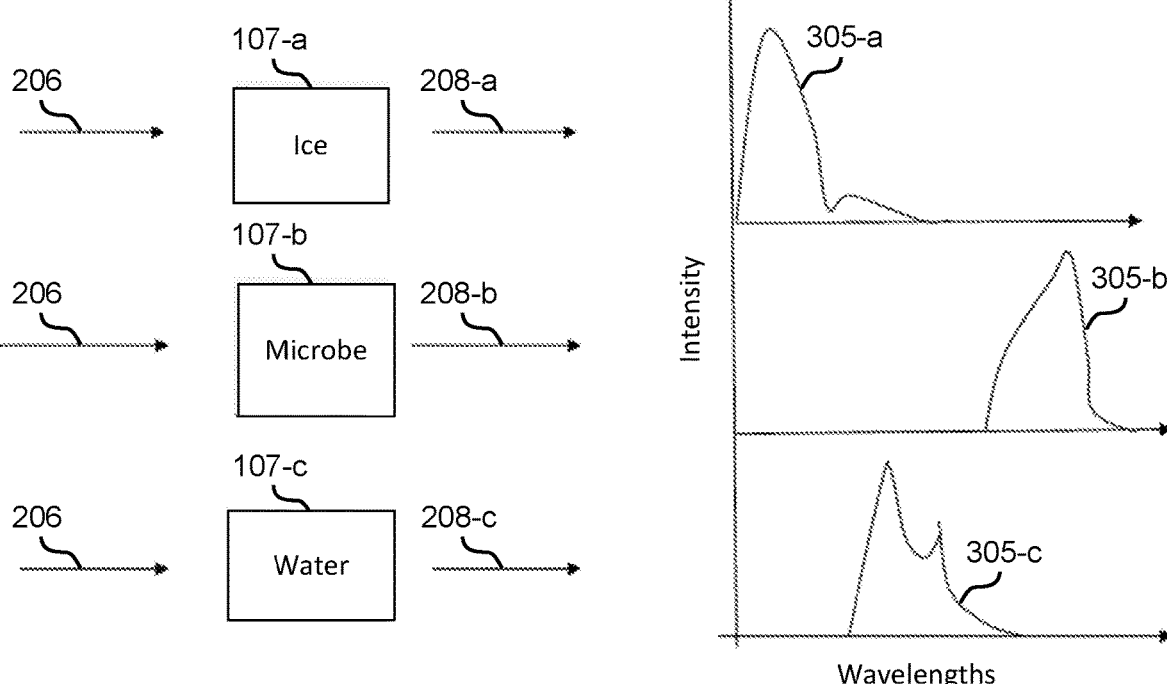
FIG. 3 is a diagram illustrating example plots in accordance with one or more embodiments of the present disclosure.

FIG. 3 is an example diagram 300 including example plots 305 of light 208 resulting from the interaction of the emitted light 206 with contaminants 107 in accordance with one or more embodiments of the present disclosure. As shown in the example plots 305, each contaminant 107 (e.g., contaminant 107-*a*, contaminant 107-*b*, contaminant 107-*c*) has a corresponding wavelength of excitation for emitted light 206 incident the contaminant 107.

With reference to FIGS. 2 and 3, the analysis device 210 may identify the presence of a contaminant 107 (e.g., contaminant 107-*a* (for example, ice)) in response to comparing the wavelength of light 208 (e.g., light 208-*a*) to the wavelength of light resulting from the incidence of the emitted light 206 at the fuel 106. In some aspects, the analysis device 210 may determine the presence or absence of the contaminant 107 by comparing the intensity of the light 208 (e.g., light 208-*a*) to a threshold intensity value. The analysis device 210 may determine the type of the contaminant 107 based on a comparison of the wavelength of the light 208 (e.g., light 208-*a*) to candidate wavelengths (corresponding to candidate contaminant types) included in the table 227.

According to one or more embodiments of the present disclosure, the contamination detection system 110 may implement spectroscopy techniques in association with analyzing captured light 207 and determining the presence or absence of contaminants 107 as described herein. For example, the analysis device 210 may be implemented by a spectrometer capable of viewing and analyzing a range (or a spectrum) of a given characteristic for a substance (e.g., fuel 106, contaminants 107) or a range of wavelengths. In an example, the analysis device 210 is capable of measuring wavelengths of captured light 207 that has interacted with a substance (e.g., fuel 106, contaminant 107). In some cases, the manner in which the emitted light 206 changes during the interaction (e.g., scattering/reflection, absorption, transmission through) a substance is characteristic of the substance.

According to one or more embodiments of the present disclosure, the contamination detection system 110 supports static and dynamic operational modes. For example, the contamination detection system 110 may perform operations described herein (e.g., emit the light 206, capture light 207, generate optical signal 216, convert the optical signal 216 to the electronic signal 221, generate the data 226, display multidimensional representation 231, and the like) in response to one or more trigger conditions.

An example of a static operational mode is described herein. In the example, an aircraft 101 has halted for a temporal period (e.g., the aircraft 101 is in a static state or parked). In response to a user input at user interface 230, the contamination detection system 110 is enabled. Additionally, or alternatively, the contamination detection system 110 may be activated for static analyzation in response to the contamination detection system 110 detecting that the aircraft 101 has been halted (e.g., based data provided by sensor devices included in the aircraft 101, and the like).

In an example, in response to activation of the contamination detection system 110, the contamination detection system 110 may initiate a countdown time (of a pre-determined or configured time period t (also referred to herein as a temporal duration)) for letting the fuel 106 in the fuel tank 105 stabilize. In response to the elapsing of the time period t, the contamination detection system 110 subjects the fuel 106 in the tank 105 with a laser (e.g., emitted light 206). The laser, when passing through fuel 106 (which may have different contaminants 107) results in light 207 that includes light 208 of different wavelengths. The collection device 215 captures the light 208 along with respective intensities as described herein. The collection device 215 transmits optical signal 216 to optical detection device 220, which generates electronic signal 221 based on the optical signal 216. Computing device 225 analyzes the fuel 106 and contaminations 107 based on the data included in the electronic signal 221.

The contamination detection system 110 supports dynamic (e.g., user prompted) analysis. For example, the contamination detection system 110 may be enabled or activated at any suitable time (e.g., during a refueling operation, while aircraft 101 is in flight, while aircraft 101 is parked, and the like) and implement the operations described in response to a user input at user interface 230.

In some cases, the contamination detection system 110 may be enabled at any suitable time to implement the operations described herein in response to one or more trigger conditions. Non-limiting examples of trigger conditions include other temporal criteria (e.g., elapsed time since a fuel contamination analysis was performed) and temperature criteria (e.g., a temperature threshold value of fuel 106, a temperature threshold value of the exterior of the aircraft 101). One or more embodiments of the present disclosure support enabling or activating the contamination detection system 110 in response to any suitable combination of the conditions (e.g., temporal duration t, user input, other temporal criteria, temperature criteria, and the like) described herein.

In one or more embodiments, the static analysis method may include performing spectral analysis when the aircraft 101 is on the ground and/or the fuel tank 105 is stable without being moved or used. In one or more embodiments, the dynamic spectral analysis provides an opportunity to the pilot to test the fuel tank 105 during flight per user preference. For example, in some cases the temperature of the fuel 106 in the fuel tank 105 decreases and causes the water in the fuel 106 to settle to the bottom of the fuel tank 105 and freeze, and resultant ice crystals can block fuel inlet pipes.

Figure 4:
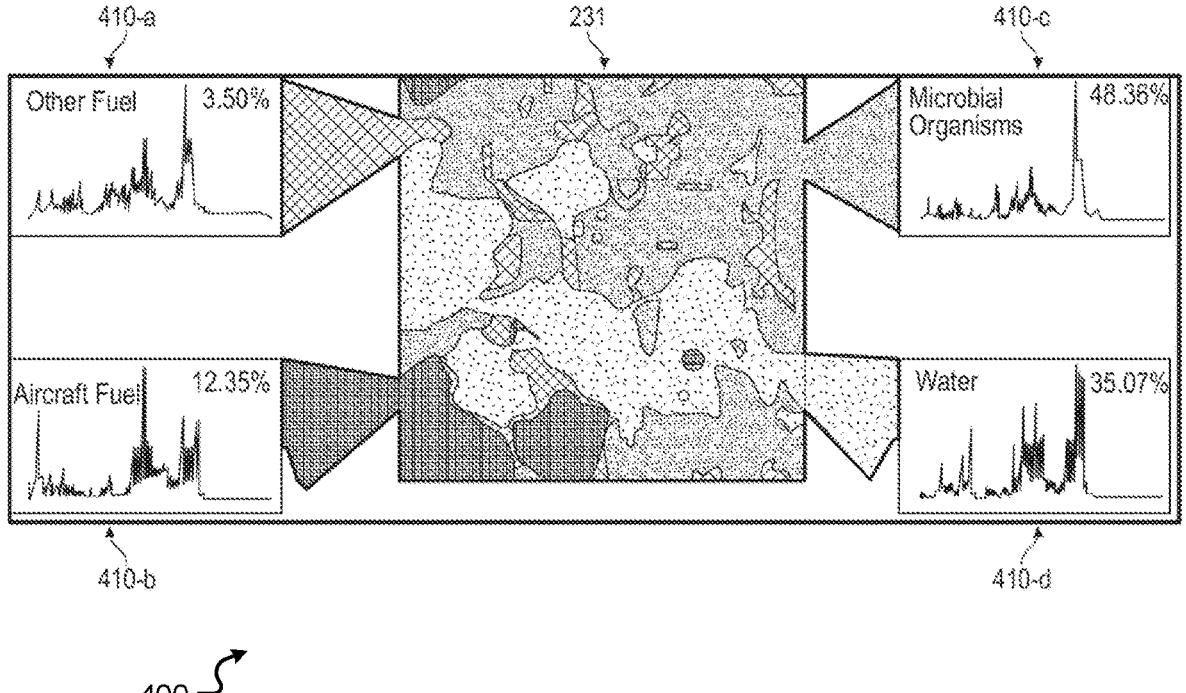
FIG. 4 illustrates an example of a multi-dimensional representation generated by a contamination detection systems in accordance with one or more embodiments of the present disclosure.

FIG. 4 illustrates an example of a multi-dimensional representation 231 generated by contamination detection systems 110 and displayable at user interface 230 (e.g., a display screen) in accordance with one or more embodiments of the present disclosure.

In one or more embodiments, the multidimensional representation 231 may be a 2D visualization of the contaminants 107 or a 3D visualization of the contaminants 107. In an example, the contamination detection system 110 may display, via the multidimensional representation 231, graphical representations (e.g., color representations, grayscale representations, symbol based representations, and the like) of the contaminants 107 and respective sizes/shapes of the contaminants 107. In some aspects, the contamination detection system 110 may display the contaminants 107 scaled to size on the user interface 230. In some aspects, the contamination detection system 110 may provide numerical representations of any suitable portion of the data 226 described herein.

The contamination detection system 110 may be controllable at an instrument panel of the aircraft 101 or another device (e.g., a mobile computing device, a smart device, and the like) capable of electronic communication with the contamination detection system 110, and the features described herein with respect to the contamination detection system 110 are supportive of providing (e.g., pilots, maintenance personnel, and the like) with a multidimensional representation 231 of fuel contamination with increased efficiency, increased accuracy, and big picture information compared to other techniques (e.g., visual inspection, water detecting paste).

In one or more embodiments, the contamination detection system 110 may display, in combination with the multidimensional representation 231, a percentage of the fuel 106 (at 410-b) and a percentage of a contaminant (e.g., at 410-b, 410-c, and 410-d) with respect to the capacity of the fuel tank 105.

In one or more embodiments, the data 226 generated by the contamination detection system 110 may include a ratio associated with the contaminants 106 and the fuel 105. In one or more embodiments, the data 226 may include a flow parameter of the fuel 105 and a contaminant 107 associated with the flow parameter. For example, the data 226 may include an indication of a contaminant 107 (e.g., ice) impacting the flow parameter.

In one or more embodiments, the data 226 may include location information of the fuel 106 or contaminants 107 with respect to the volume of the fuel tank 105. In one or more embodiments, the data 226 may include location information of the fuel 106 or contaminants 107 with respect to components (e.g., fuel inlet valve, fuel outlet valve, fuel level sensors, fuel boost pump, fuel vent, fuel drain valve, anti-slosh baffle, and the like) of the fuel tank 105. For example, the data 226 may include an indication of whether a contaminant 107 is present within a threshold distance of a fuel inlet valve and causing a blockage.

According to one or more embodiments of the present disclosure, the contamination detection system 110 is capable of generating an alert based on an analysis of the data 226. For example, the contamination detection system 110 is capable of generating an alert (and providing the alert via the user interface 230) in response to detecting that a contaminant 107 (e.g., due to amount of the contaminant 107, location of the contaminant 107, and the like) is impacting a flow parameter of the fuel 106.

The contamination detection system 110 is capable of providing any suitable information included in the data 226 in association with fuel contamination analysis, via the user interface 230.

Figure 5:
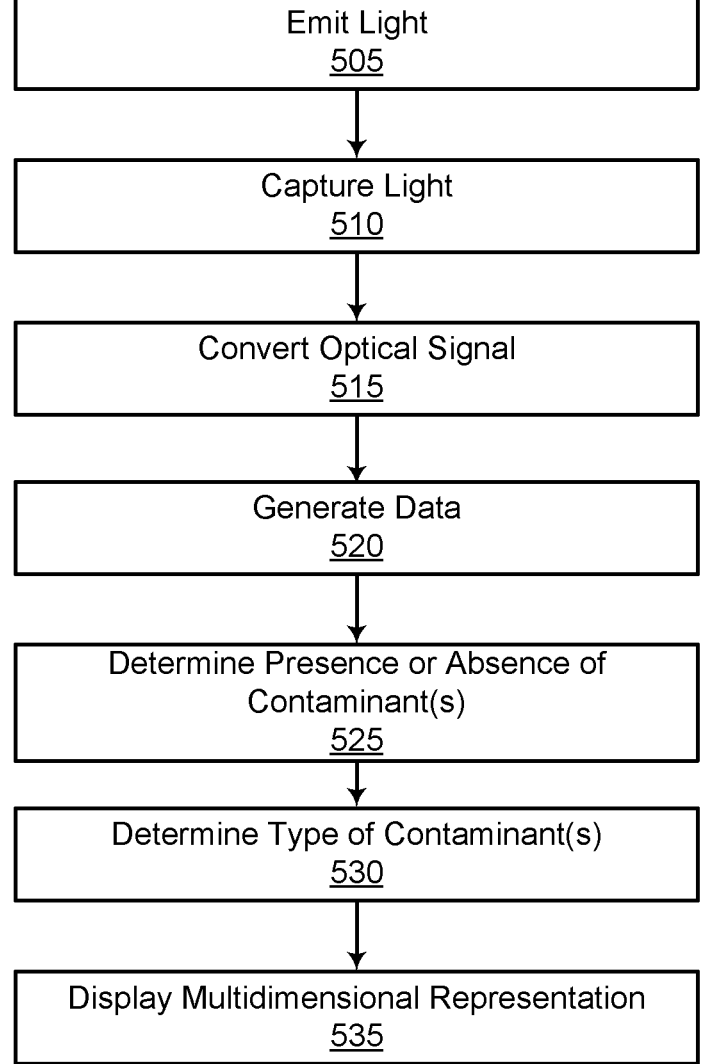
FIG. 5 illustrates an example flowchart of a method in accordance with one or more embodiments of the present disclosure.
Figure 5:
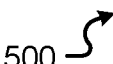

FIG. 5 illustrates an example flowchart of a method 500 in accordance with one or more embodiments of the present disclosure. The method 500 may be implemented by the example aspects of a contamination detection system 110 as described herein.

The method 500 can be implemented by a contamination detection system associated with a fuel tank, the contamination detection system including: a source device, a collection device, an optical detection device, and a computing device.

At 505, the method 500 includes emitting light into the fuel tank.

At 510, the method 500 includes capturing scattered light resulting from the emitted light interacting with fuel in the fuel tank and providing an optical signal corresponding to the captured scattered light.

In one or more embodiments, the captured scattered light includes: first light associated with a reflection or a transmission of the emitted light by the fuel, where the first location information of the fuel is determined by the computing device based on a first intensity value associated with the first light. In one or more embodiments, the captured scattered light includes second light associated with a second reflection or a second transmission of the emitted light by the one or more contaminants, where the second location information of the one or more contaminants is determined by the computing device based on a second intensity value associated with the second light.

In one or more embodiments, the captured scattered light includes: first light associated with a reflection or a transmission of the emitted light by the fuel, where the first light is of a first wavelength; and second light associated with a reflection or a transmission of the emitted light by the one or more contaminants, where the second light is of a second wavelength different from the first wavelength, where a wavelength of the emitted light is different from the first wavelength and the second wavelength.

At 515, the method 500 includes converting the optical signal to an electronic signal representative of properties of the captured scattered light, where the properties include a wavelength and an intensity value of one or more portions of the captured scattered light.

At 520, the method 500 includes generating, based on the electronic signal, data including an indication of: a presence or absence of one or more contaminants included in the fuel tank; and a type of the one or more contaminants. In one or more embodiments, the indication is of first location information of the fuel with respect to at least one of: a volume of the fuel tank; the one or more contaminants; and one or more components of the fuel tank. In one or more embodiments, the indication is of second location information of the one or more contaminants with respect to at least one of: the volume of the fuel tank; the fuel; and the one or more components of the fuel tank.

In one or more embodiments, the one or more contaminants include at least one of: ice; water; one or more microbes; and a second fuel, where the second fuel is of a second fuel type different from a first fuel type of a first fuel included in the fuel tank.

In one or more embodiments, the data further includes a second indication of at least one of: a percentage of the fuel with respect to a capacity of the fuel tank; a second percentage of the one or more contaminants with respect to the capacity of the fuel tank; and a ratio associated with the one or more contaminants and the fuel.

In one or more embodiments, the data further includes an indication of: a flow parameter of the fuel; and a contaminant associated with the flow parameter.

At 525, the method 500 includes determining the presence or absence of the one or more contaminants based on a comparison of a wavelength of the one or more portions of the captured scattered light to a reference wavelength corresponding to a presence of the fuel.

At 530, the method 500 includes determining the type of the one or more contaminants based on a comparison of the wavelength of the one or more portions of the captured scattered light to a set of candidate wavelengths corresponding to a set of candidate contaminant types.

At 535, the method 500 includes displaying a multidimensional representation of the fuel tank, the fuel, and the one or more contaminants, via a user interface, based on the data generated by the computing device.

In one or more embodiments, the method 500 includes emitting the light, capturing the scattered light, converting the optical signal to the electronic signal, and generating the data in response to one or more trigger conditions, where the one or more trigger conditions include a user input and a temporal condition.

In one or more embodiments, the method 500 can be implemented in combination with a second contamination detection system including: a second source device emitting second light into the fuel tank; and a second collection device capturing second scattered light resulting from the emitted second light interacting with the fuel and providing a second optical signal corresponding to the captured second scattered light. In one or more embodiments, the first source device and the collection device are disposed along a first axis of the fuel tank; the second source device and the second collection device are disposed along a second axis of the fuel tank; the optical detection device converts the second optical signal to a second electronic signal representative of the properties of the captured second scattered light; and the computing device generates the data further based on the second electronic signal.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank system, comprising:

a fuel tank; and a contamination detection system associated with the fuel tank, the contamination detection system comprising:

source device configured to emit light into the fuel tank;

a collection device configured to capture scattered light resulting from the emitted light interacting with fuel in the fuel tank and provide an optical signal corresponding to the captured scattered light;

an optical detection device configured to convert the optical signal to an electronic signal representative of properties of the captured scattered light, wherein the properties comprise a wavelength and an intensity value of one or more portions of the captured scattered light;

a user interface; and a computing device configured to generate, based on the electronic signal, data comprising an indication of:

a presence or absence of one or more contaminants comprised in the fuel tank;

a type of the one or more contaminants;

first location information of the fuel with respect to at least one of:

a volume of the fuel tank;

the one or more contaminants; and one or more components of the fuel tank; and second location information of the one or more contaminants with respect to at least one of:

the volume of the fuel tank;

the fuel; and the one or more components of the fuel tank, wherein the contamination detection system is configured to display a multidimensional visualization of the fuel tank, the fuel, and the one or more contaminants, including respective spatial locations of the fuel and the one or more contaminants within the fuel tank, via the user interface, based on the data generated by the computing device.

2. The fuel tank system of claim 1, wherein the captured scattered light comprises:

first light associated with a reflection or a transmission of the emitted light by the fuel, wherein the first location information of the fuel is determined by the computing device based on a first intensity value associated with the first light; and second light associated with a second reflection or a second transmission of the emitted light by the one or more contaminants, wherein the second location information of the one or more contaminants is determined by the computing device based on a second intensity value associated with the second light.

3. The fuel tank system of claim 1, wherein the data further comprises a second indication of at least one of:

a percentage of the fuel with respect to a capacity of the fuel tank;

a second percentage of the one or more contaminants with respect to the capacity of the fuel tank; and a ratio associated with the one or more contaminants and the fuel.

4. The fuel tank system of claim 1, wherein the data further comprises an indication of:

a flow parameter of the fuel; and a contaminant impacting the flow parameter.

5. The fuel tank system of claim 1, wherein the computing device is further configured to:

determines the presence or absence of the one or more contaminants based on a comparison of a wavelength of the one or more portions of the captured scattered light to a reference wavelength corresponding to a presence of the fuel; and determines the type of the one or more contaminants based on a comparison of the wavelength of the one or more portions of the captured scattered light to a set of candidate wavelengths corresponding to a set of candidate contaminant types.

6. The fuel tank system of claim 1, wherein the captured scattered light comprises:

first light associated with a reflection or a transmission of the emitted light by the fuel, wherein the first light is of a first wavelength; and second light associated with a reflection or a transmission of the emitted light by the one or more contaminants, wherein the second light is of a second wavelength different from the first wavelength, wherein a wavelength of the emitted light is different from the first wavelength and the second wavelength.

7. The fuel tank system of claim 1, wherein the one or more contaminants comprise at least one of:

ice;

water;

one or more microbes; and a second fuel, wherein the second fuel is of a second fuel type different from a first fuel type of a first fuel comprised in the fuel tank.

8. The fuel tank system of claim 1, further comprising a second contamination detection system comprising:

a second source device configured to emit second light into the fuel tank; and a second collection device configured to capture second scattered light resulting from the emitted second light interacting with the fuel and provide a second optical signal corresponding to the captured second scattered light, wherein:

the source device and the collection device are disposed along a first axis of the fuel tank;

the second source device and the second collection device are disposed along a second axis of the fuel tank;

the optical detection device is configured to convert the second optical signal to a second electronic signal representative of the properties of the captured second scattered light; and the computing device is configured to generate the data further based on the second electronic signal.

9. The fuel tank system of claim 1, wherein:

the contamination detection system is configured to emit the light, captures the scattered light, converts the optical signal to the electronic signal, and generates the data in response to one or more trigger conditions, wherein the one or more trigger conditions comprise a user input and a temporal condition.

10. A fueled vehicle including the fuel tank system of claim 1.

11. A computer-implemented method comprising:

emitting, by source device in response to a control signal, light into a fuel tank;

capturing scattered light resulting from the emitted light interacting with fuel in the fuel tank and providing an optical signal corresponding to the scattered light;

converting the optical signal to an electronic signal representative of properties of the captured scattered light, wherein the properties comprise a wavelength and an intensity value of one or more portions of the captured scattered light;

generating, based on the electronic signal, data comprising an indication of:

a presence or absence of one or more contaminants comprised in the fuel tank;

a type of the one or more contaminants;

first location information of the fuel with respect to at least one of:

a volume of the fuel tank;

the one or more contaminants; and one or more components of the fuel tank; and second location information of the one or more contaminants with respect to at least one of:

the volume of the fuel tank;

the fuel; and the one or more components of the fuel tank; and displaying a multidimensional visualization of the fuel tank, the fuel, and the one or more contaminants, including respective spatial locations of the fuel and the one or more contaminants within the fuel tank, via a user interface, based on the data.

12. The computer-implemented method of claim 11, wherein the captured scattered light comprises:

first light associated with a reflection or a transmission of the emitted light by the fuel, wherein the first location information of the fuel is determined based on a first intensity value associated with the first light; and second light associated with a second reflection or a second transmission of the emitted light by the one or more contaminants, wherein the second location information of the one or more contaminants is determined based on a second intensity value associated with the second light.

13. The computer-implemented method of claim 11, wherein the data further comprises a second indication of at least one of:

a percentage of the fuel with respect to a capacity of the fuel tank;

a second percentage of the one or more contaminants with respect to the capacity of the fuel tank; and

16 a ratio associated with the one or more contaminants and the fuel.

14. The computer-implemented method of claim 11, wherein the data further comprises a second indication of:

a flow parameter of the fuel; and a contaminant impacting the flow parameter.

15. The computer-implemented method of claim 11, further comprising:

determining the presence or absence of the one or more contaminants based on a comparison of a wavelength of the one or more portions of the captured scattered light to a reference wavelength corresponding to a presence of the fuel; and determines the type of the one or more contaminants based on a comparison of the wavelength of the one or more portions of the captured scattered light to a set of candidate wavelengths corresponding to a set of candidate contaminant types.

16. The computer-implemented method of claim 11, wherein the captured scattered light comprises:

first light associated with a reflection or a transmission of the emitted light by the fuel, wherein the first light is of a first wavelength; and second light associated with a reflection or a transmission of the emitted light by the one or more contaminants, wherein the second light is of a second wavelength different from the first wavelength, wherein a wavelength of the emitted light is different from the first wavelength and the second wavelength.

17. The computer-implemented method of claim 11, wherein the one or more contaminants comprise at least one of:

ice;

water;

one or more microbes; and a second fuel, wherein the second fuel is of a second fuel type different from a first fuel type of a first fuel comprised in the fuel tank.

18. The computer-implemented method of claim 11, further comprising:

emitting, by a second source device in response to the control signal, second light into the fuel tank;

capturing second scattered light resulting from the emitted second light interacting with the fuel and providing a second optical signal corresponding to the captured second scattered light; and converting the second optical signal to a second electronic signal representative of the properties of the captured second scattered light, wherein generating the data is further based on the second electronic signal.

* * * * *